United States Patent [19]
Weber

[11] Patent Number: 5,165,653
[45] Date of Patent: Nov. 24, 1992

[54] PRESSURE EQUALIZATION VALVE FOR A HYDRAULIC SYSTEM

[75] Inventor: J. Roger Weber, Chillicothe, Ill.

[73] Assignee: Caterpillar Inc., Peoria, Ill.

[21] Appl. No.: 748,995

[22] Filed: Aug. 22, 1991

[51] Int. Cl.$^5$ .................. F16K 31/12; F15B 7/10
[52] U.S. Cl. .................. 251/57; 137/625.65; 60/545; 60/592
[58] Field of Search .......... 251/57, 129.06; 137/625.65; 60/545, 592

[56] References Cited

U.S. PATENT DOCUMENTS

| | | | |
|---|---|---|---|
| 3,648,967 | 3/1972 | O'Neill et al. | 251/57 |
| 4,085,920 | 4/1978 | Waudoit | 251/57 |
| 4,684,104 | 8/1987 | Micard | 251/129.06 X |
| 4,762,300 | 8/1988 | Inagaki et al. | 251/129.06 |
| 4,782,807 | 11/1988 | Takahashi | 123/506 |

FOREIGN PATENT DOCUMENTS 1400397 7/1975 United Kingdom .
1569638 6/1980 United Kingdom .

*Primary Examiner*—Martin P. Schwadron
*Assistant Examiner*—Kevin L. Lee
*Attorney, Agent, or Firm*—J. Wesley Blumenshine

[57] ABSTRACT

A system in which movement of a first member from a first position to a second position is translated through fluid in a fluid chamber to movement of a second member from a first position to a second position, the system having a pressure equalization line in communication with the fluid chamber allowing fluid to flow into the chamber when the second member is at its first position and out of the chamber when the second member nears the first position when returning from its second position towards its first position.

15 Claims, 1 Drawing Sheet

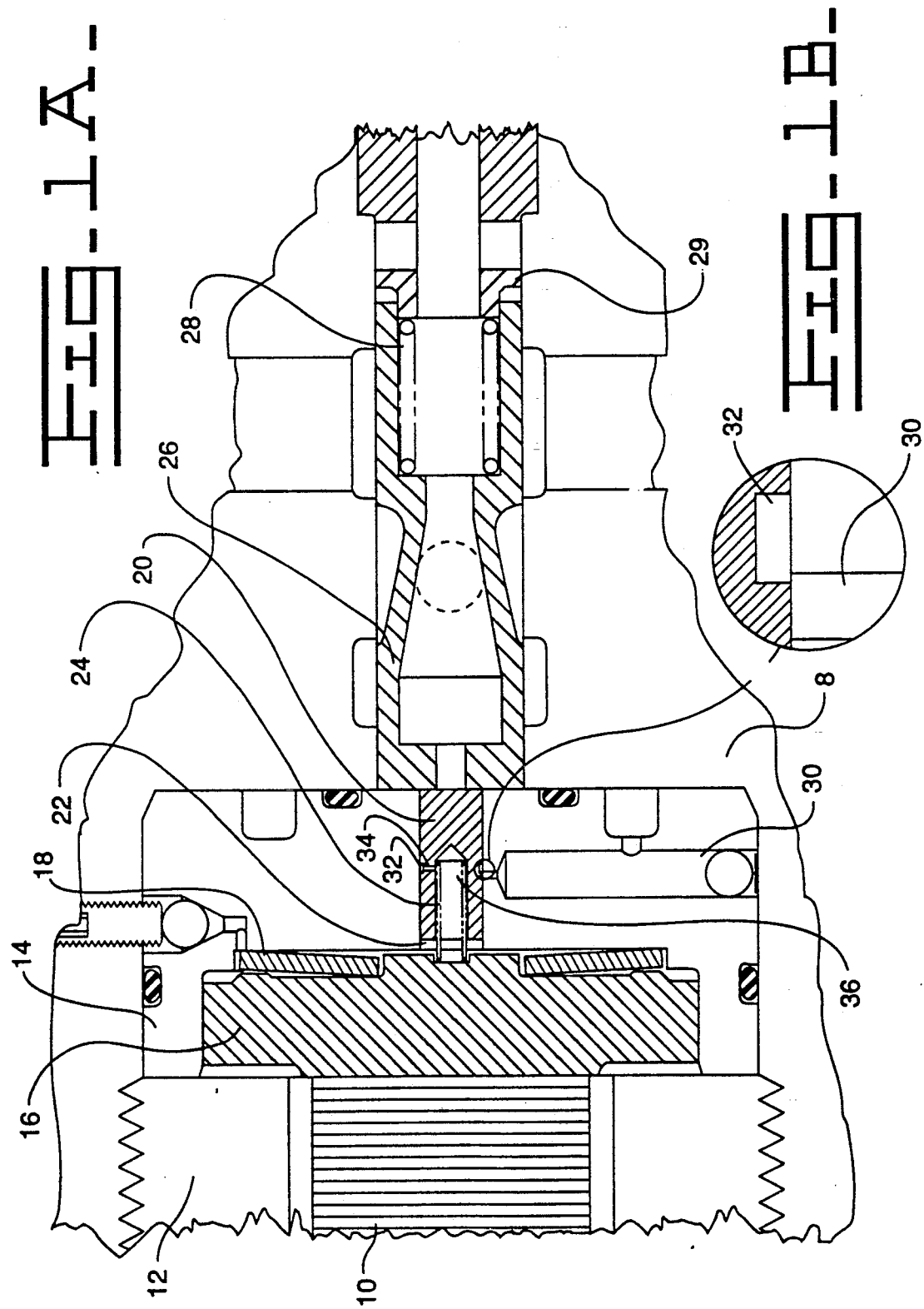

PRESSURE EQUALIZATION VALVE FOR A HYDRAULIC SYSTEM

TECHNICAL FIELD

The present invention relates generally to systems in which movement of a first member from a first position to a second position is translated through fluid in a fluid chamber to movement of a second member from a first position to a second position, and more particularly to a pressure equalization line in communication with the fluid chamber allowing fluid to flow into or out of the chamber when the second member is at the first position and into or out of the chamber when the second member nears the first position when traveling from its second position towards its first position.

BACKGROUND ART

In systems of the present type, it is usually critical that the moving members be able to repeat their movements exactly and instantaneously. An example is the use of such systems for the control of the opening and closing events of engine valves or the actuation of a fuel injector. Commonly, in such systems, an electroexpansive module, such as a piezoelectric motor, functions to drive a relatively large diameter piston which is in hydraulic fluid communication with a smaller diameter piston. In this way, the downward displacement of the larger piston resulting from actuation of the piezoelectric motor may be small while the downward displacement of the smaller piston will be considerably greater because the downward displacement of the smaller piston is equal to the downward displacement of the larger piston multiplied by a quotient obtained by dividing the effective surface area of the larger piston by that of the smaller piston. In such systems, the space or chamber between the larger piston and the smaller piston and the hydraulic fluid which fills the chamber, deserve important consideration.

In prior art systems, as shown in U.S. Pat. No. 3,501,099, entitled "Electromechanical Actuator Having an Active Element of Electroexpansive Material", which patent issued to Benson on Mar. 17, 1970, the space was closed, meaning the fluid in the space could not be resupplied in the event of a leak, or bled, in the event of a surplus. Disadvantages of such systems were that because there were moving parts, leakage out of the space was not uncommon, and also, after repeated heating and use of the hydraulic fluid, its viscosity and other characteristics could change. Obviously, such events could change the reaction time and movement of the smaller piston resulting in timing problems of other events such as fuel injection, air intake, and exhaust outlet.

A later prior art system, disclosed in British patent specification No. 1,569,638, entitled "Internal Combustion Engine", published on Jun. 18, 1980, was intended to solve the leakage problem by providing a resupply line having a ball check valve therein to the fluid chamber. However, there was no ability to bleed excess fluid.

Apparently, no one has seen a need to provide a bleed line to the fluid chamber, apparently figuring that because the volume of the chamber stays constant, there should be no need to bleed the chamber. However, this is not necessarily the case. After the piezoelectric motor has been energized and then shut off, the piezoelectric motor may retain some thermal expansion. Or, there may be thermal expansion of the hydraulic fluid in the fluid chamber as it heats up, thus preventing the small piston from returning fully to its first position. Thus, the large piston is unable to return fully to its first position and the biasing force against the smaller piston trying to return it to its first position is not great enough to overcome the pressure retained in the fluid chamber, thus the smaller piston will not return fully to its first position.

The provision of a bleed line or a pressure equalization line to the fluid chamber will allow the pressure in the fluid chamber to be dissipated, thus allowing the biasing force of the smaller piston to overcome the hydraulic pressure and return fully to its first position, in spite of the thermal expansion of the piezoelectric motor or hydraulic fluid, and this is an object of the present invention.

DISCLOSURE OF THE INVENTION

In a system having a first member displaceable by an actuation force between a first position and a second position and a second member displaceable between a first position and a second position, and a fluid chamber therebetween, said second member being biased towards said first position, and wherein in the absence of the following improvement said second member is subject to not returning to said first position when said actuation force is ended due to an excess of hydraulic pressure in said fluid chamber, the improvement comprising:

a pressure equalization line, said pressure equalization line being in communication with said fluid chamber allowing fluid to flow into or out of said fluid chamber when said first member is at said first position, and said pressure equalization line being in communication with said fluid chamber when said second member is at a position intermediate of said first position and said second position allowing fluid to flow out of said fluid chamber allowing said second member to return to said first position.

BRIEF DESCRIPTION OF THE DRAWINGS

FIG. 1A is a cross sectional side view of a preferred embodiment of the present invention taken through the centerline of the piezoelectric motor, large and small pistons and spool valve.

FIG. 1B is an expanded view of the circled area of FIG. 1A.

BEST MODE FOR CARRYING OUT THE INVENTION

A preferred embodiment of the present invention in a system for displacing a spool valve between a first position (shown) and a second position (not shown) to the right of the first position, is shown in FIG. 1.

The system is housed within the body 8 and includes an electroexpansive module such as a piezoelectric motor 10 of the conventional stacked disc type, as are well known in the art, a first housing 12 having external threads and being screwed into the threaded opening in the body for housing the piezoelectric motor 10, a second housing 14, a first member 16 which in this embodiment is a relatively large diameter piston housed in the second housing 14 adjacent the piezoelectric motor 10, the large diameter piston 16 being displaceable between a first position (shown) and a second position (not shown) to the right of the first position, a belleville spring 18 for biasing the large diameter piston 16 towards the first position, a second member 20, which in this embodiment is a relatively small diameter piston, housed in the second housing 14 and displaceable between a first position (shown) and a second position (not shown) to the right of the first position, a fluid chamber 22 between the large piston 16 and the small piston 20, a first compression spring 24 for biasing the small and large pistons 20,16 away from each other, a spool valve 26 displaceable between a first position (shown) and a second position (not shown) to the right of the first position, a second compression spring 28 between the stop 29 and the spool valve 26 for biasing the spool valve 26 towards the first position, and a pressure equalization line 30 in communication with the fluid chamber 22.

The pressure equalization line 30 communicates with the fluid chamber 22 via an opening(s) in the small piston, which in the embodiment shown are an annulus 32 about the circumference of the small piston 20, a port 34 in the small piston 20 and a bore 36 in the small piston 20. The pressure equalization line 30 is a line of constant supply low pressure fluid. The fluid may be hydraulic fluid, engine oil, or some other fluid.

The housings 12,14, piezoelectric motor 10, pistons 16,20, spool valve 26, stop 29, and pressure equalization line 30 all have circular cross sections.

INDUSTRIAL APPLICABILITY

The purpose of the system shown is to provide practically instantaneous and controlled displacement of the spool valve 26 between its first position and its second position. Electric current is introduced to the piezoelectric motor 10 causing it to expand. Expansion of the piezoelectric motor 10 overcomes the force of the belleville spring 18 and actuates displacement of the large piston 16 from its first position to its second position. As the large piston 16 moves from its first position to its second position, hydraulic pressure is generated in the fluid in the fluid chamber 22. The force of the hydraulic pressure against the small piston 20 overcomes the force of the second compression spring 28 and moves the spool valve 26 from its first position to its second position. As the small piston 20 moves towards the second position, communication between the pressure equalization line 30 and the annulus 32 around the small piston 20 is cut off and the fluid chamber 22 becomes closed and basically of constant volume.

Note that at the first position of the small piston 20 the annulus 32 is not centered over the pressure equalization line 30, but, instead, barely communicates with it. By this configuration, the pressure generated in the fluid in the fluid chamber 22 by the movement of the large piston 16 from its first to its second position will begin the movement of the small piston 20 and cut off communication with the pressure equalization line 30 before the pressure in the fluid can be dissipated. Yet, however, the small opening between the pressure equalization line 30 is sufficient to bleed or replenish the fluid chamber 22 when the small piston 20 nears the first position from the second position.

When the electric current to the piezoelectric motor 10 is ended, or in other words the motor 10 is shut off, it contracts. In the absence of the actuation force, the belleville spring 18 forces the large piston 16 from its second position towards its first position. The second compression spring 28 forces the spool valve 26 from its second position towards its first position. The spool valve 26 forces the small piston 20 from its second position towards its first position. Near the small piston's 20 first position, the annulus 32 around the circumference of the small piston 20 communicates with the pressure equalization line 30 putting the fluid chamber 22 in communication with the pressure equalization line 30. If fluid has leaked from the fluid chamber 22, the pressure equalization line 30 will resupply the fluid chamber 22 with fluid. If there has been thermal expansion of the piezoelectric motor 10, thus preventing the large piston 16 from returning fully to its first position, thus preventing the small piston 20 and resultingly the spool valve 26 from returning fully to their first positions due to the fact that the fluid chamber 22 is closed and basically of constant volume, or for some other reason such as thermal expansion of the hydraulic fluid, there is too much hydraulic pressure in the fluid chamber 22 for the second compression spring 28 to overcome the pressure and fully return the spool valve 26 and small piston 20 to their first positions, fluid will flow out of the fluid chamber 22 and into the pressure equalization line 30, thus dissipating the hydraulic pressure in the fluid chamber 22 and allowing a decrease in the volume of the fluid chamber 22, thus allowing the second compression spring 28 to overcome the pressure in the fluid chamber 22 and return the spool valve 26 and small piston 22 fully to their first positions.

As used in the claims, the phrase "only when said second member is near said first position" is intended to include only those positions of the second member at which the second member is near its first position and the position at which the second member has fully returned to its first position.

In one alternative embodiment of the present invention, there is no small piston 20 and movement of the large piston 16 is translated through the fluid directly to move the spool valve 26.

In another alternative embodiment, there is no small 20 or large 16 piston and movement of the piezoelectric motor 10 is translated through the fluid directly to move the spool valve 26.

Other aspects, objects, and advantages of this invention can be obtained from a study of the drawing, the disclosure, and the appended claims.

I claim:

1. In a system having a first member displaceable between a first position and a second position, a second member displaceable between a first position and a second position and a fluid chamber therebetween, wherein movement of said first member in the direction from said first position towards said second position results in movement of said second member in the direction from said first position towards said second position, the improvement comprising:

a pressure equalization line, said pressure equalization line being in communication with said fluid chamber allowing fluid to flow into said fluid chamber when said second member is at said first position and said pressure equalization line being in communication with said fluid chamber allowing fluid to flow out of said fluid chamber only when said second member is near said first position.

2. The system of claim 1, wherein displacement of said first member results from expansion of an electroexpansive module.

3. The system of claim 1, wherein said first member is a relatively large diameter piston and said second member is a relatively small diameter piston.

4. The system of claim 3, said small diameter piston having an opening between said fluid chamber and the circumference of said small diameter piston, said pressure equalization line communicating with said fluid chamber via said opening in said relatively small diameter piston.

5. The system of claim 1, wherein said second member is a valve.

6. The system of claim 1, wherein said first member and said second member are biased towards their respective first positions.

7. In a system having a first member displaceable by an actuation force between a first position and a second position, a second member displaceable between a first position and a second position, and a fluid chamber therebetween, wherein movement of said first member in the direction from said first position towards said second position results in movement of said second member in the direction from said first position towards said second position, said second member being biased towards said first position, and wherein in the absence of the following improvement said second member is subject to not returning to said first position when said actuation force is ended due to an excess of hydraulic pressure in said fluid chamber, the improvement comprising:

a pressure equalization line, said pressure equalization line being in communication with said fluid chamber allowing fluid to flow into or out of said chamber when said second member is at said first position and said pressure equalization line being in communication with said fluid chamber when said second member is at a position intermediate of said first position and said second position allowing fluid to flow out of said fluid chamber allowing said second member to return to said first position.

8. The system of claim 7, wherein said pressure equalization line communicates with said fluid chamber only when said second member is near said first position and when said second member is at said first position.

9. The system of claim 7, wherein said actuation force results from expansion of an electroexpansive module.

10. The system of claim 7, wherein said first member is a relatively large diameter piston and said second member is a relatively small diameter piston.

11. The system of claim 10, said small diameter piston having an opening between said fluid chamber and the circumference of said small diameter piston, said pressure equalization line communicating with said fluid chamber via said opening in said relatively small diameter piston.

12. The system of claim 7, wherein said second member is a valve.

13. The system of claim 7, wherein said first member is biased toward said first position.

14. In a system having a first member displaceable between a first position and a second position, a second member displaceable between a first position and a second position and a fluid chamber therebetween, wherein movement of said first member in the direction from said first position towards said second position results in movement of said second member in the direction from said first position towards said second position and wherein a force acts on said second member to displace said second member from said second position to said first position but said second member is prevented from returning from said second position fully to said first position because of excess hydraulic pressure in said fluid chamber, a method for returning said second member fully to said first position, comprising the step of:

bleeding hydraulic pressure from said fluid chamber only when said second member is near said first position to allow said second member to return to said first position.

15. The method of claim 14, said hydraulic pressure being bled through a pressure equalization line in communication with said fluid chamber.

* * * * *